US011126434B2

United States Patent
Kobayashi

(10) Patent No.: US 11,126,434 B2
(45) Date of Patent: Sep. 21, 2021

(54) PROCESSOR, INFORMATION PROCESSING APPARATUS, AND PROCESSING METHOD FOR CONVERTING A FIELD OF AN INSTRUCTION

(71) Applicant: SONY SEMICONDUCTOR SOLUTIONS CORPORATION, Kanagawa (JP)

(72) Inventor: Hiroshi Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/763,492

(22) PCT Filed: Aug. 14, 2018

(86) PCT No.: PCT/JP2018/030256
§ 371 (c)(1),
(2) Date: May 12, 2020

(87) PCT Pub. No.: WO2019/102662
PCT Pub. Date: May 31, 2019

(65) Prior Publication Data
US 2020/0310806 A1  Oct. 1, 2020

(30) Foreign Application Priority Data

Nov. 21, 2017  (JP) .............................. JP2017-223376

(51) Int. Cl.
*G06F 9/30* (2018.01)
*G06F 9/38* (2018.01)

(52) U.S. Cl.
CPC ...... *G06F 9/30181* (2013.01); *G06F 9/30145* (2013.01); *G06F 9/30149* (2013.01);
(Continued)

(58) Field of Classification Search
None
See application file for complete search history.

(56) References Cited

U.S. PATENT DOCUMENTS 6,611,909 B1 *  8/2003  Roos ................... G06F 9/261
                                                    712/211
6,662,361 B1 * 12/2003  Jackson ............... G06F 8/52
                                                    712/209
(Continued)

FOREIGN PATENT DOCUMENTS

EP     1118933 A2 *  7/2001  ............ G06F 8/52
JP     08-286911 A    11/1996
(Continued)

OTHER PUBLICATIONS

International Search Report and Written Opinion of PCT Application No. PCT/JP2018/030256, dated Oct. 2, 2018, 07 pages of ISRWO.

*Primary Examiner* — Steven G Snyder
(74) *Attorney, Agent, or Firm* — Chip Law Group

(57) ABSTRACT

A predetermined field of a fetched instruction is extended to secure an instruction type and an operand length. An instruction conversion table stores an extension field longer than the predetermined field in association with a bit pattern of the predetermined field of an instruction. An extension field acquisition unit acquires the extension field by referring to the instruction conversion table, with a bit pattern of the predetermined field of the fetched instruction. An instruction decoder performs a decoding process on a new instruction including the extension field in place of the predetermined field of the fetched instruction.

8 Claims, 13 Drawing Sheets

(52) U.S. Cl.
CPC ...... *G06F 9/30185* (2013.01); *G06F 9/30189* (2013.01); *G06F 9/3802* (2013.01)

(56) References Cited

U.S. PATENT DOCUMENTS

| | | | | |
|---|---|---|---|---|
| 7,124,283 B2* | 10/2006 | Yamada | ................ | G06F 9/3879 |
| | | | | 712/209 |
| 7,473,293 B2* | 1/2009 | Nakajima | ............. | G06F 9/3017 |
| | | | | 712/204 |
| 9,710,387 B2* | 7/2017 | Abdallah | ............ | G06F 9/30174 |
| 9,733,942 B2* | 8/2017 | Abdallah | ............. | G06F 9/3844 |
| 10,042,643 B2* | 8/2018 | Abdallah | ............. | G06F 9/3802 |
| 10,394,563 B2* | 8/2019 | Abdallah | ............ | G06F 9/30174 |
| 2003/0033504 A1* | 2/2003 | Yamada | ............. | G06F 9/30178 |
| | | | | 712/210 |
| 2004/0003204 A1* | 1/2004 | Yamada | ............. | G06F 9/30181 |
| | | | | 712/209 |
| 2006/0294490 A1* | 12/2006 | Mukund | ............. | G06F 15/7821 |
| | | | | 716/138 |
| 2007/0074010 A1 | 3/2007 | Nakajima | | |
| 2007/0079296 A1* | 4/2007 | Li | ....................... | G06F 9/45516 |
| | | | | 717/136 |
| 2012/0198157 A1* | 8/2012 | Abdallah | ............ | G06F 9/30174 |
| | | | | 711/118 |
| 2013/0024661 A1* | 1/2013 | Abdallah | ............. | G06F 9/3842 |
| | | | | 712/205 |
| 2017/0024212 A1* | 1/2017 | Abdallah | ............... | G06F 9/3842 |
| 2017/0068540 A1* | 3/2017 | Abdallah | ............ | G06F 9/30189 |
| 2017/0068541 A1* | 3/2017 | Abdallah | ................. | G06F 8/52 |

FOREIGN PATENT DOCUMENTS

| | | | |
|---|---|---|---|
| JP | 2005-025741 A | 1/2005 | |
| JP | 2007-094813 A | 4/2007 | |
| WO | WO-9928817 A2 * | 6/1999 | ......... G06F 9/30189 |

* cited by examiner

FIG. 2

| | | |
|---|---|---|
| SYSTEM-RELATED INSTRUCTION | nop, syscall | 32 INSTRUCTIONS |
| LOAD INSTRUCTION | load | 32 INSTRUCTIONS |
| STORE INSTRUCTION | store | 32 INSTRUCTIONS |
| INTER-REGISTER TRANSFER INSTRUCTION | move | 32 INSTRUCTIONS |
| ADDITION INSTRUCTION | add | 32 INSTRUCTIONS |
| SUBTRACTION INSTRUCTION | add | 32 INSTRUCTIONS |
| LOGICAL OPERATION INSTRUCTION | logical | 32 INSTRUCTIONS |
| BRANCH INSTRUCTION | branch | 32 INSTRUCTIONS — 256 INSTRUCTIONS SO FAR |
| MULTIPLICATION INSTRUCTION | mul | 32 INSTRUCTIONS |
| DIVISION INSTRUCTION | div | 32 INSTRUCTIONS |

FIG. 6
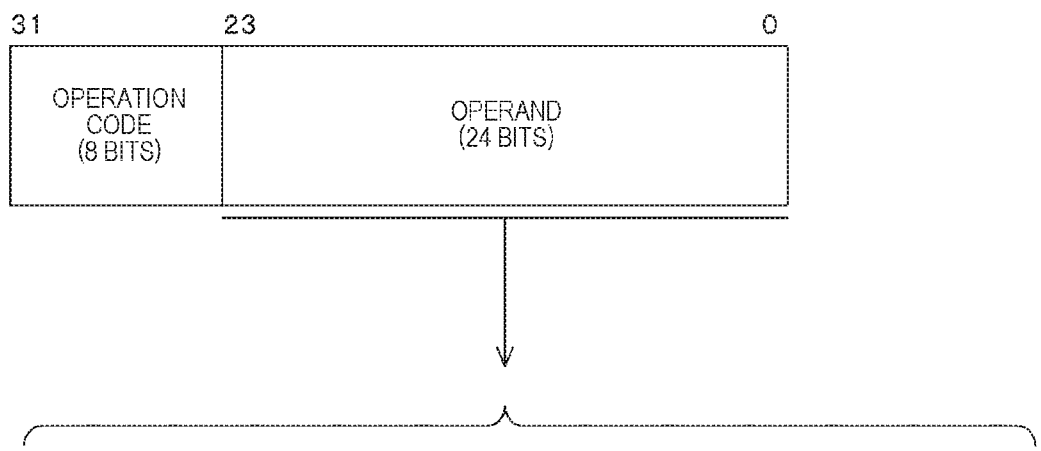
MODE = 0;
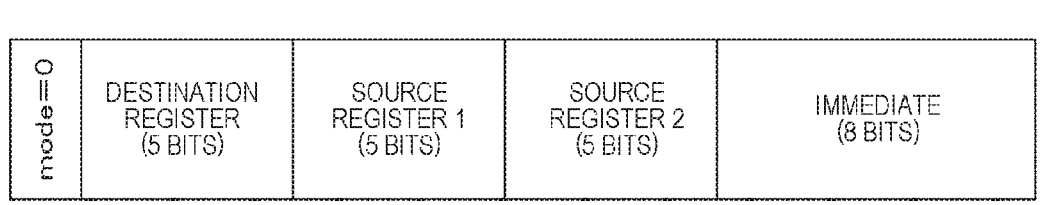
MODE = 1;
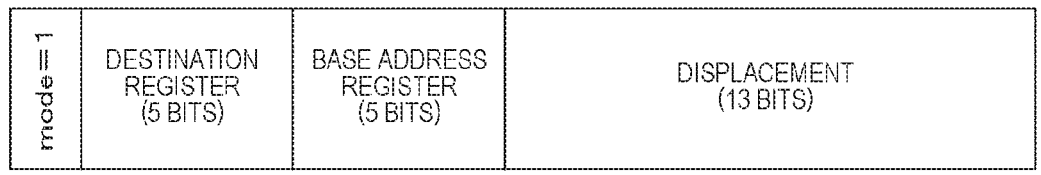

FIG. 9A

```
     31         2423 22   17     12            0
    ┌──────────┬─┬─────┬──────┬──────┬──────────┐
    │OPERATION │m│ DR  │ SR1  │ SR2  │IMMEDIATE │
    │  CODE    │o│(5   │(5    │(5    │ (8 BITS) │
    │ (8 BITS) │d│BITS)├──────┴──┬───┴──────────┤
    │          │e│     │   BR    │ DISPLACEMENT │
    │          │ │     │ (5 BITS)│   (13 BITS)  │
    │          │ ├─────┴─────────┴──────────────┤
    │          │ │          OPERAND             │
    └──────────┴─┴──────────────────────────────┘
```

```
     31                    23                  0
    ┌──────────────────┬──────────────────────┐
    │ OPERATION CODE   │      OPERAND         │
    │    (8 BITS)      │     (24 BITS)        │
    └──────────────────┴──────────────────────┘
```

(0x0c0 TO 0x0ff)

⇩

```
  43        3534 33     28       23            0
 ┌──────────┬─┬─────┬────────┬──────────────────┐
 │OPERATION │m│ DR  │ SR1/BR │   OPERAND (2)    │
 │  CODE    │o│(5   │(5 BITS)│   (24 BITS)      │
 │ (9 BITS) │d│BITS)│        │                  │
 │          │e├─────┴────────┤                  │
 │          │ │  OPERAND (1) │                  │
 └──────────┴─┴──────────────┴──────────────────┘
```

PROCESSOR, INFORMATION PROCESSING APPARATUS, AND PROCESSING METHOD FOR CONVERTING A FIELD OF AN INSTRUCTION

CROSS REFERENCE TO RELATED APPLICATIONS

This application is a U.S. National Phase of International Patent Application No. PCT/JP2018/030256 filed on Aug. 14, 2018, which claims priority benefit of Japanese Patent Application No. JP 2017-223376 filed in the Japan Patent Office on Nov. 21, 2017. Each of the above-referenced applications is hereby incorporated herein by reference in its entirety.

TECHNICAL FIELD

The present technology relates to a processor. Specifically, the present invention relates to a processor that fetches an instruction from a memory to perform a decoding process, an information processing apparatus, a processing method in these, and a program for causing a computer to execute the method.

BACKGROUND ART

Conventional processors, especially a complex instruction set computer (CISC), a very long instruction word (VLIW), and a transport triggered architecture (TTA), tend to have a longer instruction word length in order to realize a combination of multiple instructions. A frequency of a combination of used instructions differs for every application. Therefore, there is a problem that a code size is increased due to generation of waste in a specific application.

Whereas, in a conventional processor, bit field assignment of an instruction needs to be established at a time of designing an instruction decoder. Therefore, in executing an application program, a logic of the instruction decoder is fixed, so that the bit field assignment of the instruction cannot be changed.

Therefore, for example, there has been proposed a method of decoding instructions of a variable-length instruction set in order to extend the instruction set (for example, see Patent Document 1).

CITATION LIST

Patent Document

Patent Document 1: Japanese Patent Application Laid-Open No. 2005-025741

SUMMARY OF THE INVENTION

Problems to be Solved by the Invention

In the conventional technique described above, an instruction set is extended by decoding instructions of a variable-length instruction set. However, in this conventional technique, an instruction space is extended by using an escape code, and there is a problem that control for interpreting the escape code becomes complicated. Furthermore, there is a problem that a code size becomes large depending on a frequency of an extension instruction by the escape code.

The present technology has been made in view of such a situation, and an object of the present invention is to extend a substantial instruction word length to secure an instruction type and an operand length, by converting a predetermined field of a fetched instruction.

Solutions to Problems

The present technology has been made to solve the problems described above, and a first aspect is a processor including: an instruction conversion table that stores an extension field longer than a predetermined field in association with a bit pattern of the above-described predetermined field of an instruction; an extension field acquisition unit configured to acquire the above-described extension field by referring to the above-described instruction conversion table with a bit pattern of the above-described predetermined field of a fetched instruction; and an instruction decoder configured to perform a decoding process on a new instruction including the above-described extension field in place of the above-described predetermined field of the above-described fetched instruction, an information processing apparatus including the processor, and a processing method in these. Therefore, an effect is exhibited that the decoding process is performed as a new instruction including an extension field longer than the predetermined field in the fetched instruction.

Furthermore, in this first aspect, the above-described instruction conversion table may associate at least a part of a bit pattern of an operation code with the bit pattern as the above-described predetermined field, to store an operation code of the above-described new instruction as the above-described extension field. Therefore, an effect is exhibited that the decoding process is performed as a new instruction including an operation code longer than the operation code in the fetched instruction.

Furthermore, in this first aspect, the above-described instruction conversion table may associate at least a part of a bit pattern of an operation code with the bit pattern as the above-described predetermined field, to store an operation code of the above-described new instruction and at least a part of an operand as the above-described extension field. Therefore, an effect is exhibited that the decoding process is performed as a new instruction including a new operand.

Furthermore, in this first aspect, the above-described instruction conversion table may include mode information as the above-described extension field, and the above-described instruction decoder may interpret an operand in the above-described new instruction in accordance with the above-described mode information. Therefore, an effect is exhibited that the decoding process is performed as a new instruction including an extension field containing the mode information.

Furthermore, in this first aspect, the above-described extension field acquisition unit may acquire the above-described extension field on condition that a bit pattern of the above-described predetermined field of the above-described fetched instruction is a specific pattern, and the above-described instruction decoder may perform a decoding process on the above-described fetched instruction in a case where a bit pattern of the above-described predetermined field of the above-described fetched instruction is not the above-described specific pattern. Therefore, an effect is exhibited that the decoding process is performed only on a part of the instruction as a new instruction including the extension field.

Furthermore, in this first aspect, a rewrite execution unit configured to rewrite a storage content of the above-described instruction conversion table described above may be further provided. Therefore, an effect is exhibited that a new instruction including the extension field is dynamically changed.

Furthermore, in this first aspect, the above-described rewrite execution unit may rewrite, in a case where an instruction decoded by the above-described instruction decoder is a rewrite instruction of the above-described instruction conversion table, the above-described instruction conversion table to a content specified by the instruction. Therefore, an effect is exhibited that a new instruction is dynamically changed with use of the rewrite instruction.

Effects of the Invention

According to the present technology, it is possible to achieve an excellent effect that a predetermined field of a fetched instruction can be extended to secure an instruction type and an operand length. Note that the effects described herein are not necessarily limited, and any of the effects described in the present disclosure is possible.

BRIEF DESCRIPTION OF DRAWINGS

FIG. 2 is a view illustrating an example of an instruction format before conversion according to the first embodiment of the present technology.

FIG. 6 is a view illustrating an example of an instruction format before conversion according to a second embodiment of the present technology.

FIGS. 9A and 9B are views illustrating an example of an instruction format before and after conversion according to a third embodiment of the present technology.

MODE FOR CARRYING OUT THE INVENTION

Hereinafter, embodiments for implementing the present technology (hereinafter, referred to as embodiments) will be described. The description will be made in the following order.

1. First embodiment (example of operation code extension)
2. Second embodiment (example of operand extension)
3. Third embodiment (example of extending only some instructions)
4. Fourth embodiment (example of switching instruction reference table)

1. First Embodiment

[Configuration of Information Processing Apparatus]

Figure 1:
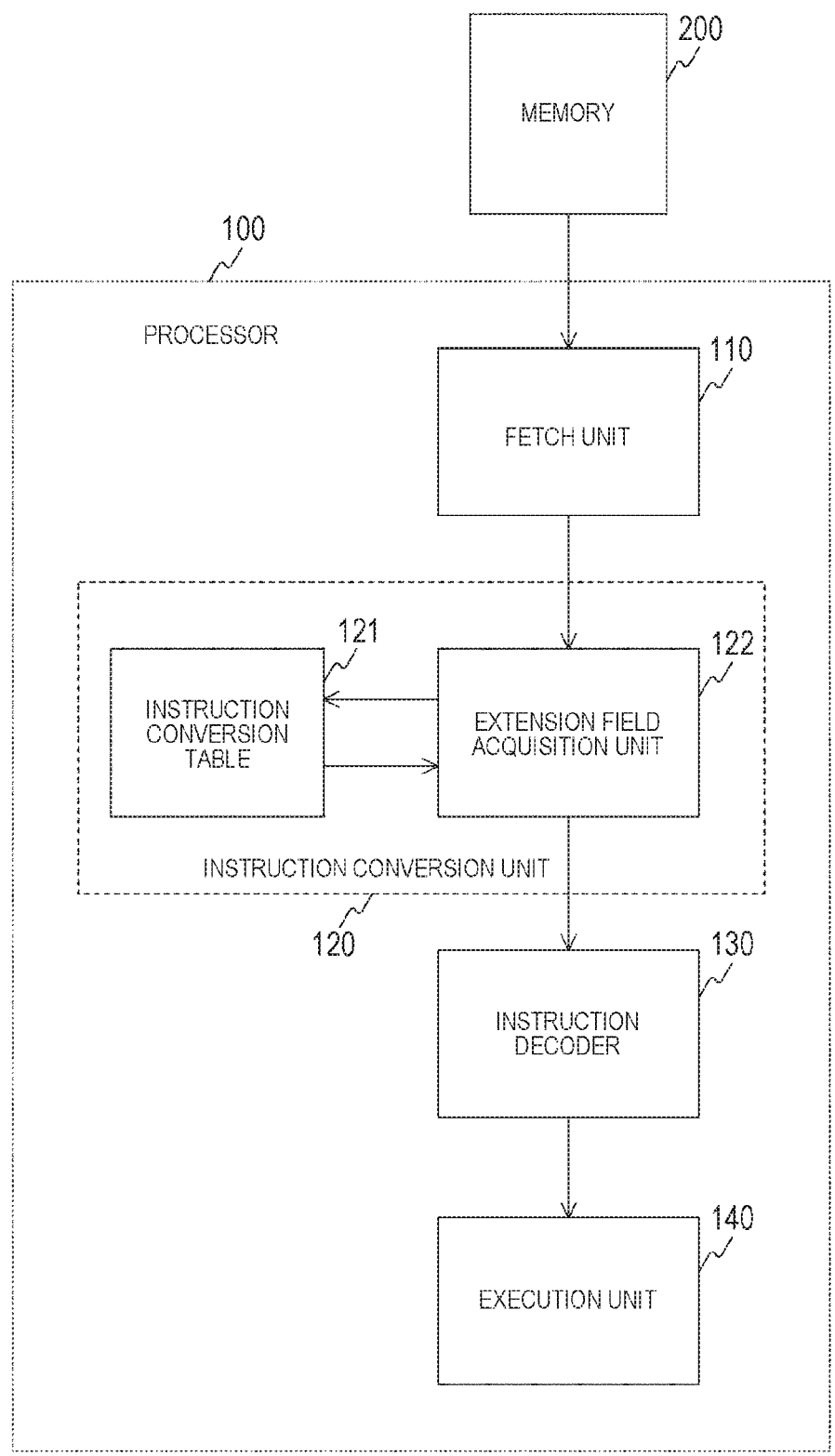
FIG. 1 is a diagram illustrating a configuration example of an information processing apparatus according to a first embodiment of the present technology.

FIG. 1 is a diagram illustrating a configuration example of an information processing apparatus according to a first embodiment of the present technology. This information processing apparatus includes a processor 100 and a memory 200.

The memory 200 is to store program instructions and data necessary for execution in the processor 100. The following description focuses on a series of flows in which the processor 100 reads an instruction from the memory 200 (instruction fetch) and decodes the instruction.

The processor 100 is to read an instruction from the memory 200 and execute the instruction. This processor 100 includes a fetch unit 110, an instruction conversion unit 120, an instruction decoder 130, and an execution unit 140.

The fetch unit 110 is to perform an instruction fetch process of reading an instruction from the memory 200. This fetch unit 110 sequentially reads instructions from an instruction sequence of a program stored in the memory 200. This fetch unit 110 basically reads instructions in an ascending order addresses, but in a case where a branch (jump) occurs due to a branch instruction or the like, the fetch unit 110 reads an instruction from a branch destination.

The instruction conversion unit 120 is to perform substitution on a predetermined field of the instruction read by the fetch unit 110, to perform instruction conversion. This instruction conversion unit 120 includes an instruction conversion table 121 and an extension field acquisition unit 122.

The instruction conversion table 121 is to store an extension field in association with a bit pattern of a predetermined field of an instruction. This extension field has a longer bit length than that of a predetermined field of an original instruction.

The extension field acquisition unit 122 is to acquire an extension field by referring to the instruction conversion table 121, with a bit pattern of a predetermined field of a fetched instruction. The instruction conversion is performed by substituting the acquired extension field for the predetermined field of the original instruction.

The instruction decoder 130 performs a decoding process on a new instruction converted by the instruction conversion unit 120. As a result of the decoding process by the instruction decoder 130, control on each unit of the processor 100 is performed. For example, instruction execution in the execution unit 140 is controlled.

The execution unit 140 executes various instructions in accordance with a result of decoding by the instruction decoder 130. For example, access to the memory 200, arithmetic processing in an arithmetic unit (not shown), and the like are executed.

[Instruction Format]

FIG. 2 is a view illustrating an example of an instruction format before conversion according to the first embodiment of the present technology.

Here, an instruction having an instruction length of 32 bits is assumed. 8 bits from a 31st bit to a 24th bit on a most significant bit (MSB) side are an operation code, and the remaining 24 bits from a 23rd bit to a 0th bit are an operand.

In a general processor, various instructions as shown in the figure are provided as an instruction set. As system-related instructions, a system call instruction (syscall) mainly used for calling a system function by an operating system, an instruction that does nothing (no operation (NOP)), and the like are classified.

A load instruction is an instruction for reading from the memory 200. A store instruction is an instruction for writing to the memory 200. An inter-register transfer instruction is an instruction for performing transfer between internal registers of the processor 100.

An addition instruction is an instruction for performing an addition process. A subtraction instruction is an instruction for performing a subtraction process. A logical operation instruction is an instruction for performing a logical operation process. A multiplication instruction is an instruction for performing a multiplication process. A division instruction is an instruction for performing a division process.

A branch instruction is an instruction for performing a branch in an instruction sequence of a program. The branch instructions include a conditional branch instruction for performing a branch when a certain condition is satisfied (or is not satisfied) and an unconditional branch instruction for performing a branch unconditionally.

In a case of assuming that these instructions are provided, if the number of types of each instruction is 32 types, then a total of 320 instructions will be provided. Assuming 8 bits as the operation code, then representation can be made up to 256 instructions. In this case, for example, it is conceivable to remove the multiplication instruction and the division instruction from the instruction set and adopt the remaining 256 instructions. However, some applications require a large number of multiplication instructions, and selection of the instruction cannot be determined sweepingly. Therefore, in this embodiment, it is considered to extend the operation code as follows.

Figure 3:
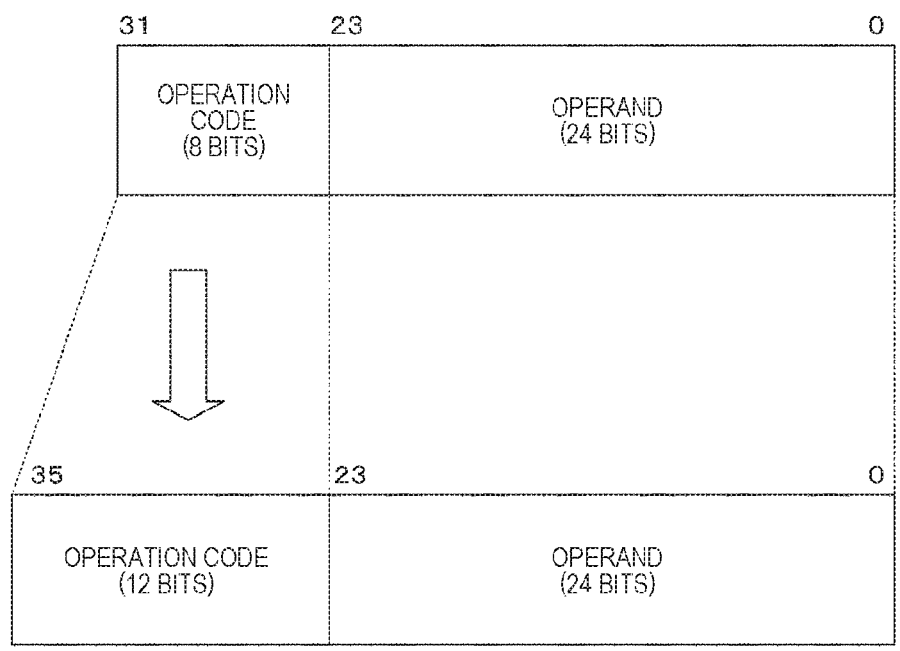
FIG. 3 is a view illustrating an example of operation code extension according to the first embodiment of the present technology.

FIG. 3 is a view illustrating an example of operation code extension according to the first embodiment of the present technology.

In this example, an 8-bit operation code is extended to 12 bits, and the instruction is converted into a total of 36-bit. Therefore, a maximum of 4096 instructions can be expressed by the 12-bit operation code, and a degree of freedom in designing the instruction set can be improved.

[Instruction Conversion Table]

Figure 4:
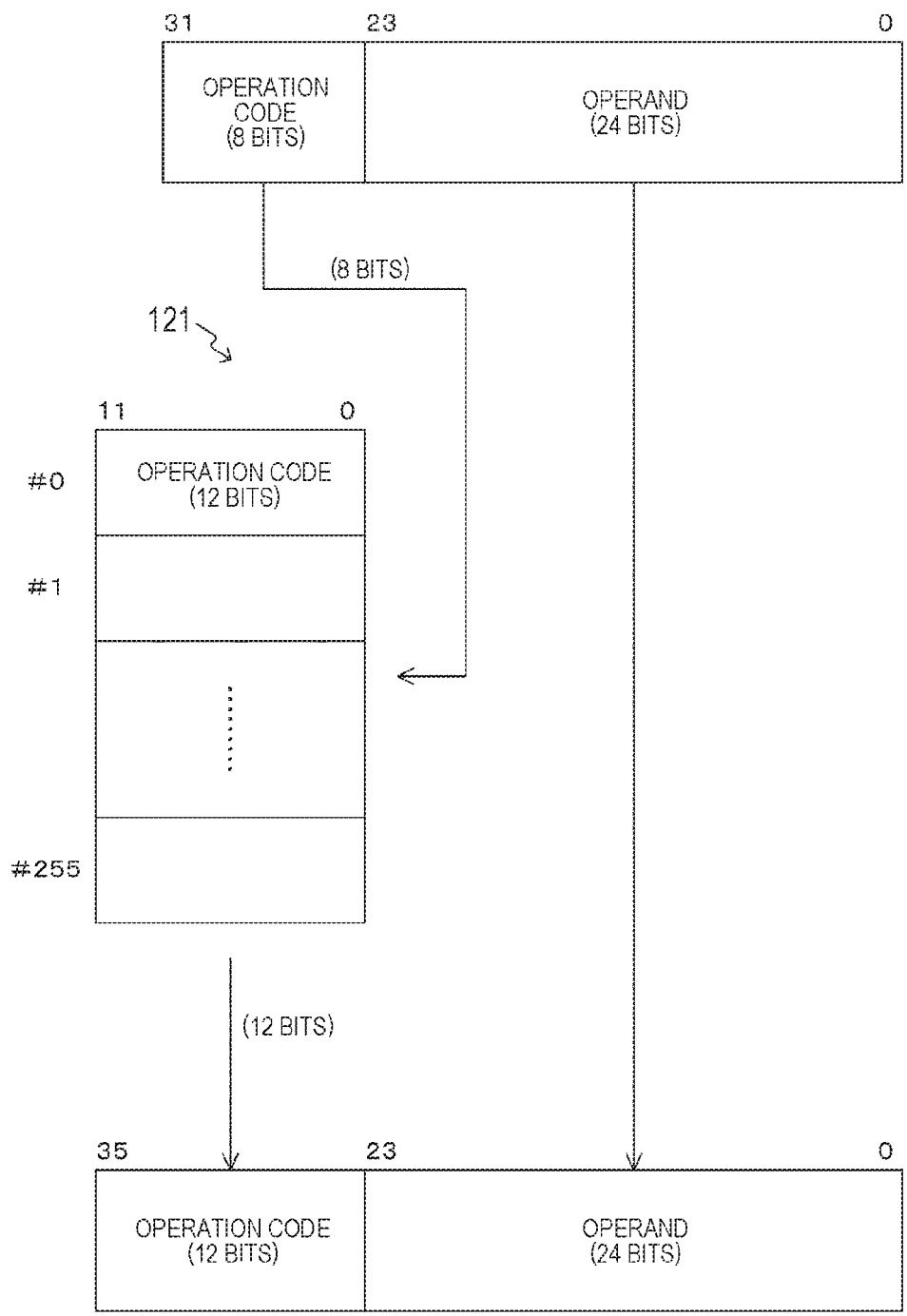
FIG. 4 is a view illustrating an example of instruction conversion by an instruction conversion table 121 according to the first embodiment of the present technology.

FIG. 4 is a view illustrating an example of instruction conversion by an instruction conversion table 121 according to the first embodiment of the present technology.

As described above, in this embodiment, a bit length of the operation code of the instruction before conversion is 8 bits. The instruction conversion table 121 stores 256 pieces of extended 12-bit operation code as an extension field in association with the 8-bit bit pattern of the operation code.

The extension field acquisition unit 122 refers to the instruction conversion table 121 and acquires the extended 12-bit operation code with a bit pattern of the 8-bit operation code of the fetched instruction. Then, an instruction having a 36-bit length is obtained by substituting the 12-bit operation code for the 8-bit operation code of the original instruction. At this time, for the 24-bit operand, the operand of the original instruction is used as it is.

However, as is clear from the figure, a number of extended 12-bit operation codes stored in the instruction conversion table 121 is 256. Therefore, assuming that the storage contents in the instruction conversion table 121 are not changed, the number of instruction types that can be used at one time is 256 instructions. In order to use other instructions, it is necessary to change the storage contents of the instruction conversion table 121. This will be described in a fourth embodiment described later.

[Operation]

Figure 5:
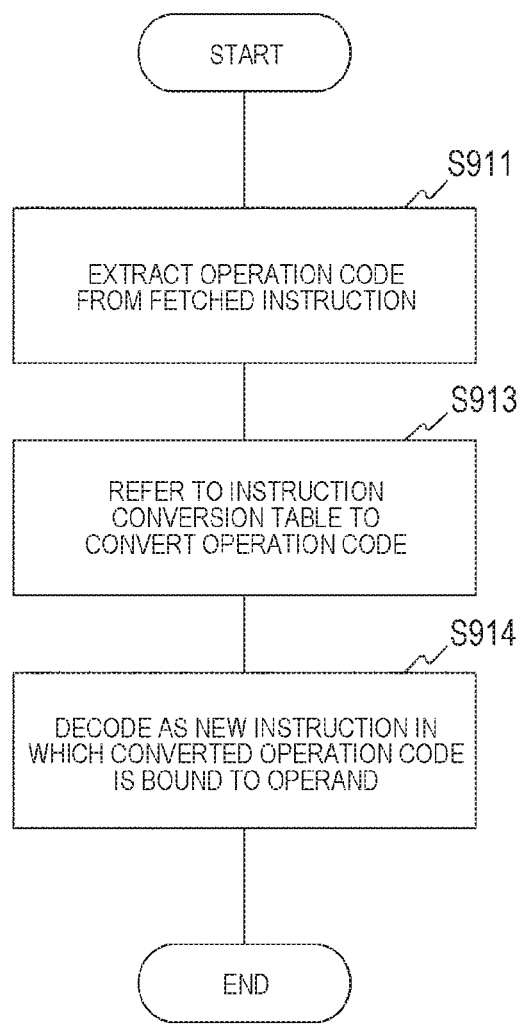
FIG. 5 is a flowchart illustrating an example of a processing procedure of a processor 100 according to the first embodiment of the present technology.

FIG. 5 is a flowchart illustrating an example of a processing procedure of the processor 100 according to the first embodiment of the present technology.

When an instruction is fetched from the memory 200 by the fetch unit 110, the extension field acquisition unit 122 extracts a bit field of the operation code from the fetched instruction (step S911). In this embodiment, as described above, the 8 bits from the 31st bit to the 24th bit on the MSB side is the operation code.

Then, the extension field acquisition unit 122 refers to the instruction conversion table 121 with the extracted bit field of the 8-bit operation code, to acquire the 12-bit operation code (step S913). Therefore, the instruction is converted to have the operation code extended to 12 bits.

The instruction decoder 130 decodes a new instruction in which the 12-bit operation code acquired by the extension field acquisition unit 122 is bound to the operand of the original instruction (step S914).

As described above, according to the first embodiment of the present technology, the operation code of the instruction can be extended by referring to the instruction conversion table 121.

2. Second Embodiment

In the first embodiment described above, while the operation code of the instruction is extended from 8 bits to 12 bits, the operand of the original instruction is used as it is for the 24-bit operand. In this second embodiment, a field that can be used as an operand is to be extended. Note that a basic configuration of a processor 100 is similar to that of the first embodiment described above, and a detailed description thereof will be omitted.

[Instruction Format]

FIG. 6 is a view illustrating an example of an instruction format before conversion according to the second embodiment of the present technology.

Here, similarly to the first embodiment described above, an instruction having an instruction length of 32 bits is assumed, 8 bits on an MSB side are an operation code, and remaining 24 bits are an operand.

In this second embodiment, it is assumed that mode information (mode) is provided in the most significant bit of the operand, and interpretation of an operand field is changed with the mode information. That is, in a case where the mode information indicates 0, one 5-bit destination register and two 5-bit source registers can be specified as an instruction for performing a register operation, and the remaining 8 bits can be used as immediate (immediate value). Since every 5 bits are assumed as the register specification field, 32 registers can be individually specified. Therefore, for example, it is possible to perform a process of holding a result of performing an operation on contents of the two source registers and the immediate, in the destination register.

In a case where the mode information indicates 1, each of one destination register and one base address register of 5 bits can be specified as an instruction for performing memory access, and the remaining 13 bits can be used as a displacement. Therefore, for example, it is possible to perform a process of accessing an address obtained by adding the displacement to contents of the base address register, and holding a result in the destination register.

In these cases, a bit length of the register specification, and the immediate or the displacement need to be within the operand field that is fixed to 24 bits. Therefore, even in a case where it is desired to increase the bit length of the immediate or displacement, there is a problem that the bit field is insufficient. On the other hand, in this second embodiment, the operand is extended by storing a part of the operand in an instruction conversion table 121.

Figure 7:
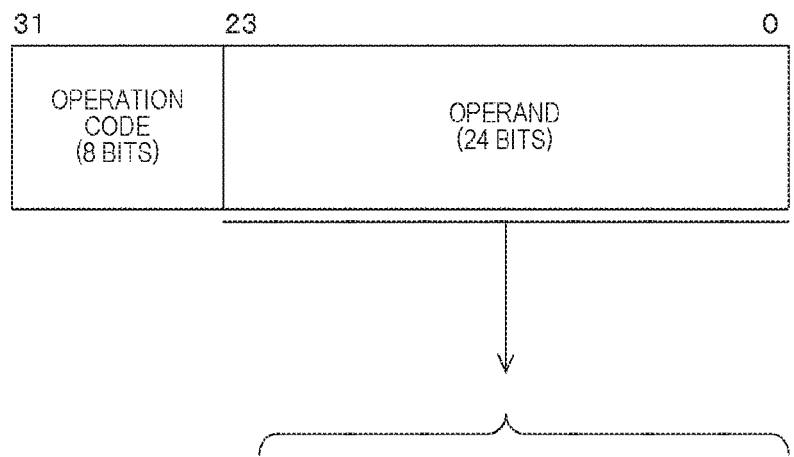
FIG. 7 is a view illustrating an example of an instruction format after conversion according to the second embodiment of the present technology.

FIG. 7 is a view illustrating an example of an instruction format after conversion according to the second embodiment of the present technology.

In this second embodiment, the operand is sectioned into two, a first half operand (1) is stored in the instruction conversion table 121, and the operand of the original instruction is used as it is as a second half operand (2). Therefore, for example, a 19-bit immediate or a 24-bit displacement can be used.

Figure 8:
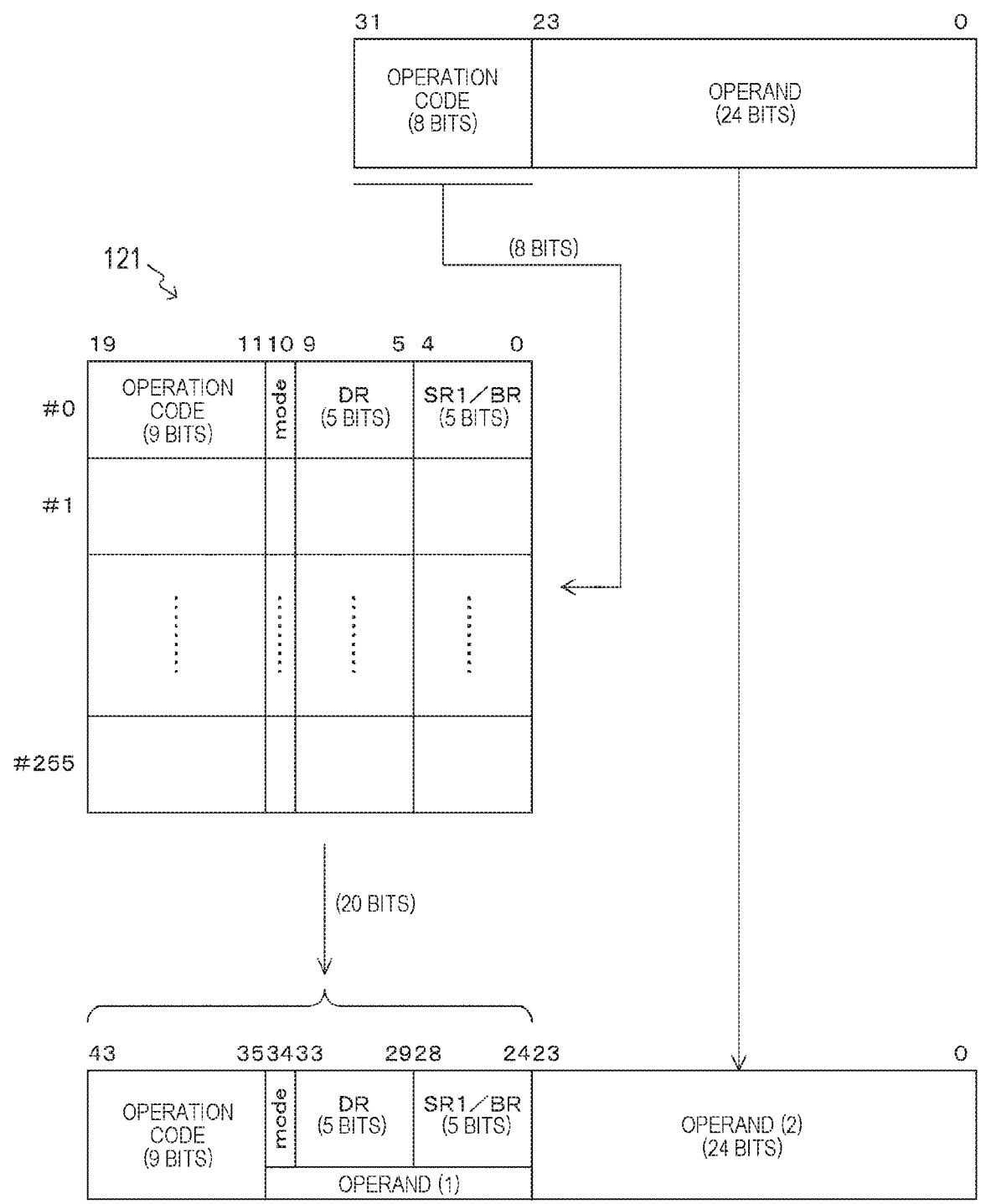
FIG. 8 is a view illustrating an example of instruction conversion by an instruction conversion table 121 according to the second embodiment of the present technology.

FIG. 8 is a view illustrating an example of instruction conversion by the instruction conversion table 121 according to the second embodiment of the present technology.

In this example, the instruction conversion table 121 stores 256 entries in association with an 8-bit bit pattern of the operation code. Each entry stores each field of a 9-bit operation code, 1-bit mode information, a 5-bit destination register, and a 5-bit source register or base address register, as extension fields. Therefore, the field is extended not only for the operation code but also for the operand.

As described above, according to the second embodiment of the present technology, the operand of the instruction can be extended by referring to the instruction conversion table 121.

3. Third Embodiment

In the first or second embodiment described above, the operation code or the operand is extended for all instructions. However, some instructions do not actually need the extension, and not all instructions need to be converted in some cases. Therefore, in a third embodiment, it is assumed that conversion is performed only for some instructions and a decoding process is performed for other instructions as they are. Note that a basic configuration of a processor 100 is similar to that of the first embodiment described above, and a detailed description thereof will be omitted.

FIGS. 9A and 9B are views illustrating an example of an instruction format before and after conversion according to the third embodiment of the present technology.

In this third embodiment, it is assumed that only some instructions are subjected to instruction conversion, and no instruction conversion is performed in other cases. That is, an extension field acquisition unit 122 acquires an extension field on condition that a bit pattern of a predetermined field of a fetched instruction is a specific pattern, and does not acquire an extension field when the fetched instruction is not a specific pattern.

For example, in a case where the operation code is from "0x000" to "0x0bf" as in a in the figure, the extension field acquisition unit 122 does not acquire the extension field, and an instruction decoder 130 performs the decoding process on the fetched instruction. Whereas, in a case where the operation code is "0x0c0" to "0x0ff" as shown in b in the figure, the extension field acquisition unit 122 acquires the extension field, and the instruction decoder 130 performs the decoding process on a new instruction including the extension field. Note that "0x" means that subsequent numbers are in hexadecimal notation.

Figure 10:
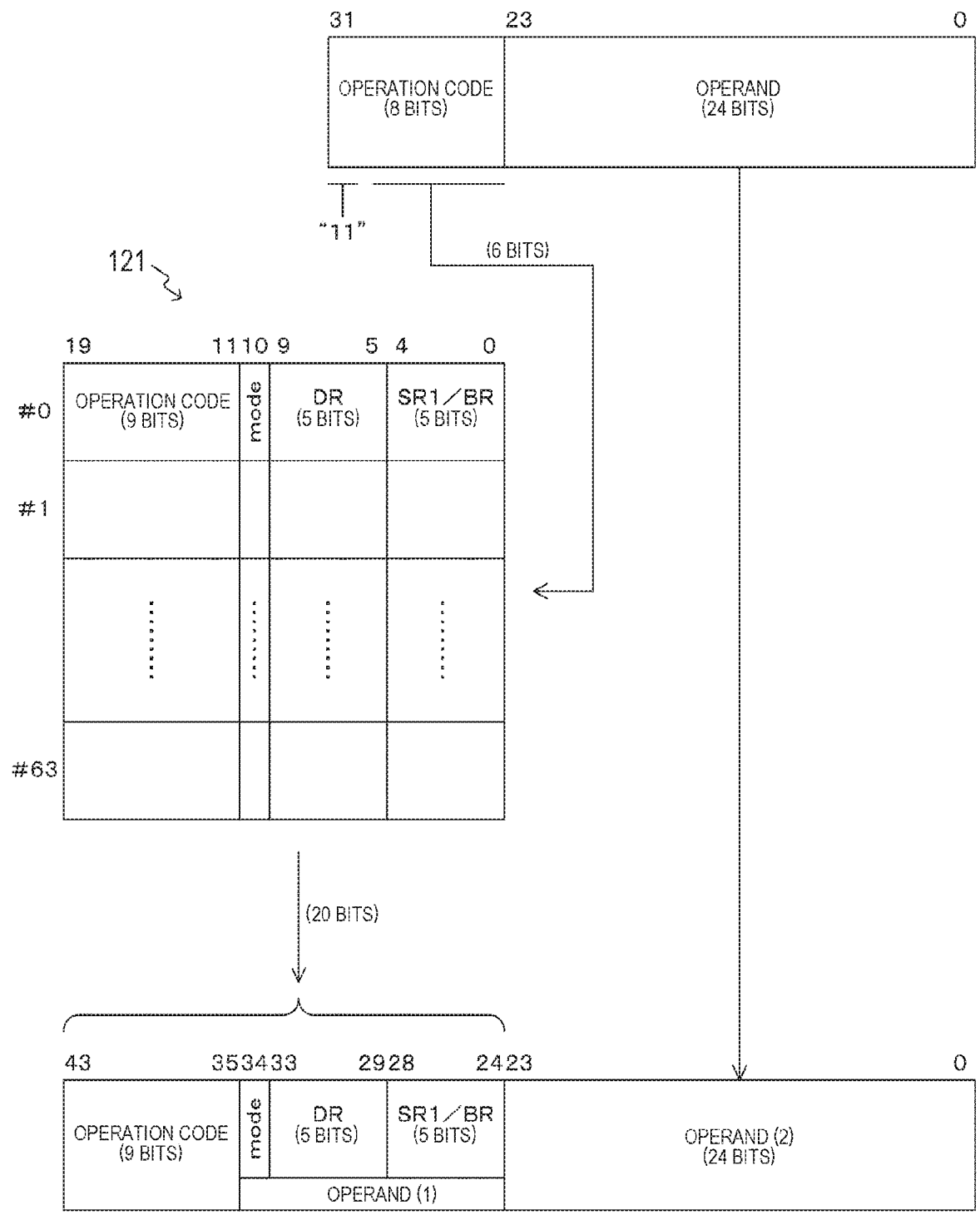
FIG. 10 is a view illustrating an example of instruction conversion by an instruction conversion table 121 according to the third embodiment of the present technology.

FIG. 10 is a view illustrating an example of instruction conversion by an instruction conversion table 121 according to the third embodiment of the present technology.

In this example, the extension field acquisition unit 122 refers to the instruction conversion table 121 to acquire the extension field, on condition that upper 2 bits of an 8-bit operation code are "0b11". Note that "0b" means that the following numbers are in binary notation.

The instruction conversion table 121 in this example has 64 entries each including 20 bits, and is referred to by a lower 6-bit bit field of the 8-bit operation code. Each entry of the instruction conversion table 121 includes each field of a 9-bit operation code, 1-bit mode information, a 5-bit destination register, and a 5-bit source register or base address register.

The acquired 20-bit extension field is bound to the 24-bit operand of the original instruction to form a new instruction with a total of 44 bits. The instruction decoder 130 performs the decoding process on this new instruction. The 20-bit extension field includes a 21-bit operand (1) in addition to the 9-bit operation code. That is, assuming that the 24-bit operand of the original instruction is the operand (2), then the operand (1) and the operand (2) are combined to constitute a 45-bit operand. In this way, not only the operation code is extended, but also the operand can be extended. That is, as described in FIG. 7, for example, a 19-bit immediate or a 24-bit displacement can be used.

[Operation]

Figure 11:
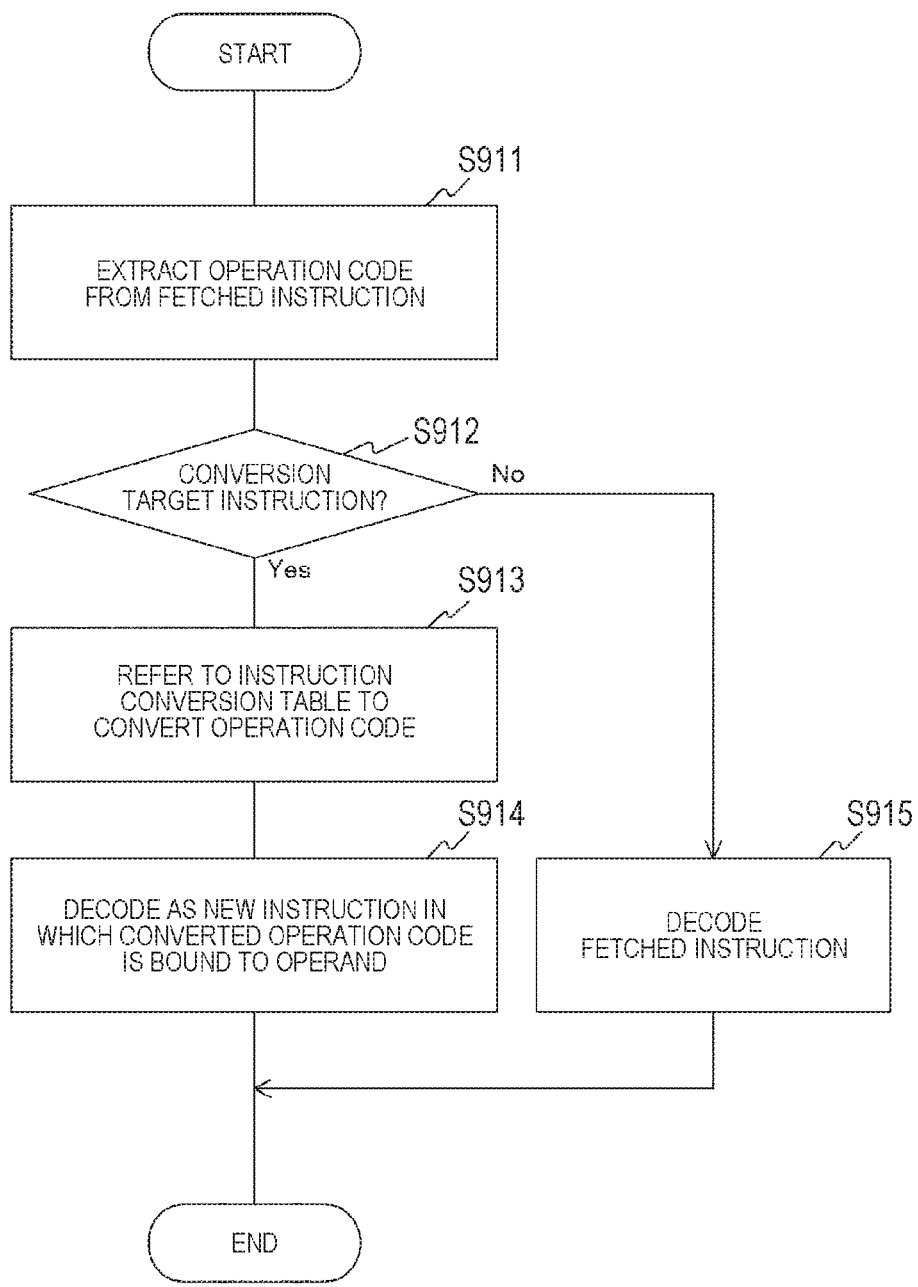
FIG. 11 is a flowchart illustrating an example of a processing procedure of a processor 100 according to the third embodiment of the present technology.

FIG. 11 is a flowchart illustrating an example of a processing procedure of the processor 100 according to the third embodiment of the present technology. Note that steps S911, S913, and S914 in the third embodiment are similar to those in the first embodiment described above.

When a bit field of the operation code is extracted from a fetched instruction in step S911, it is determined whether or not the instruction is a conversion target instruction (step S912). When the fetched instruction is a conversion target instruction (step S912: Yes), an extension field is acquired by the extension field acquisition unit 122 (step S913), and the instruction decoder 130 decodes a new instruction in which the operand of the original instruction is bound (step S914).

Whereas, when the fetched instruction is not a conversion target instruction (step S912: No), the instruction decoder 130 decodes the fetched instruction (step S915).

In this way, according to the third embodiment of the present technology, it is possible to perform conversion only on some instructions and perform the decoding process on other instructions as they are.

4. Fourth Embodiment

In the first to third embodiments described above, it is assumed that contents of the instruction conversion table 121 are set in advance, but contents of the instruction conversion table 121 can be rewritten. In this fourth embodiment, a description is given to a method of dynamically rewriting contents of an instruction conversion table 121 during execution of a program.

[Configuration of Information Processing Apparatus]

Figure 12:
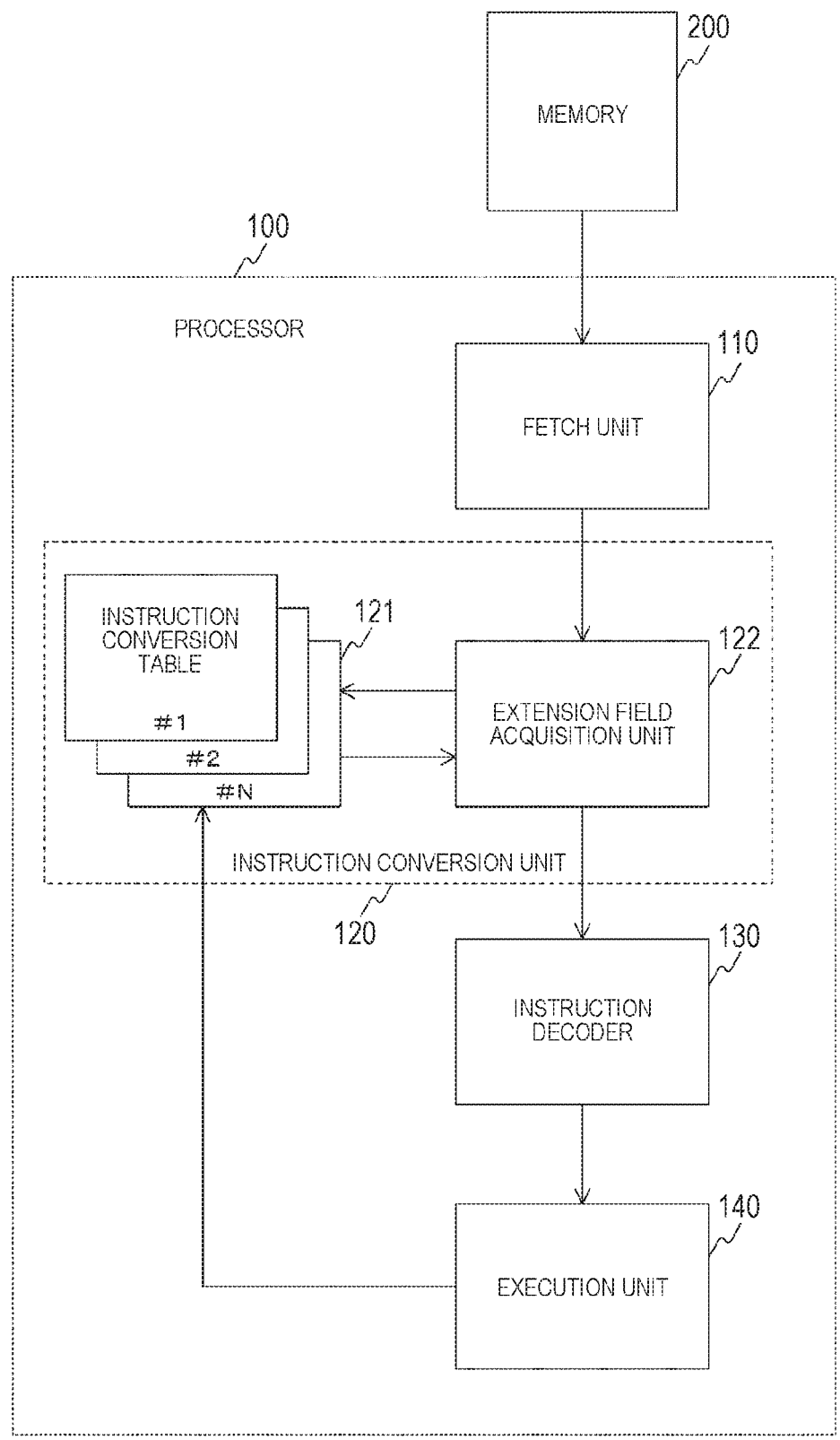
FIG. 12 is a diagram illustrating a configuration example of an information processing apparatus according to a fourth embodiment of the present technology.

FIG. 12 is a diagram illustrating a configuration example of an information processing apparatus according to the fourth embodiment of the present technology. The information processing apparatus according to the fourth embodiment is used by switching an instruction conversion table 121 to any one of N pieces by rewriting. This rewriting is performed by an execution unit 140 in accordance with a program.

[Program]

Figure 13:
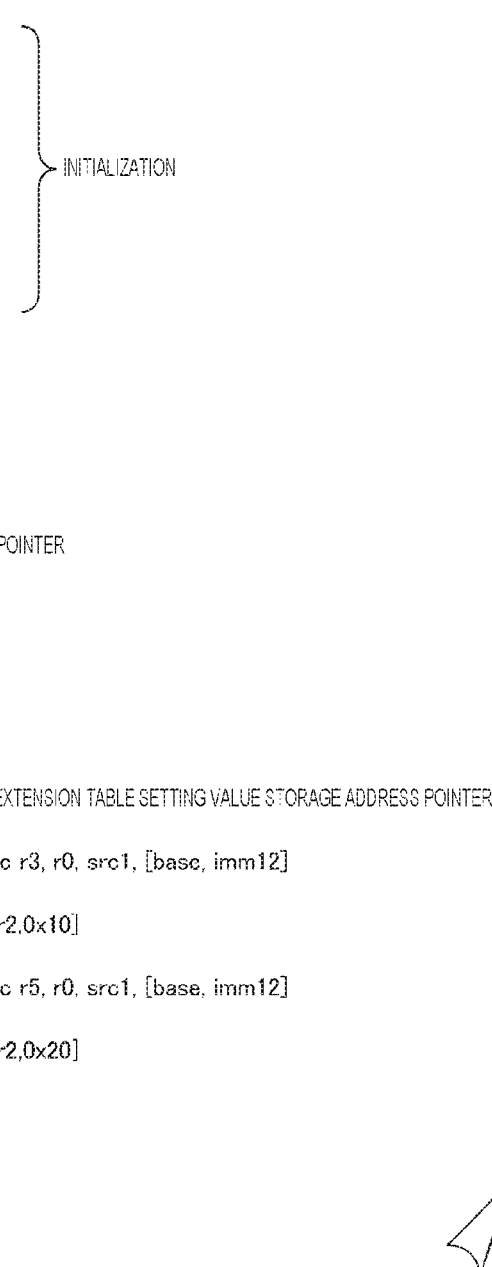
FIG. 13 is a view illustrating an example of a program for rewriting an instruction conversion table 121 according to the fourth embodiment of the present technology.

FIG. 13 is a view illustrating an example of a program for rewriting the instruction conversion table 121 according to the fourth embodiment of the present technology.

The first to fifth lines are initialization parts. #ins_def is an address of a memory area where a converted instruction is stored. The instruction on the first line is a move instruction for setting an address of #ins_def in a register r4.

t0 to t3 are four entries of the instruction conversion table 121. The instructions on the second to fifth lines are load instructions for loading setting contents of the instruction conversion table 121 from a memory 200 into t0 to t3. Therefore, the converted instruction is set in the instruction conversion table 121.

Note that setting an initial value of the instruction conversion table 121 to NOP allows prevention of malfunction.

data is an address of a memory area where data is stored. The 11th line is a move instruction for setting an address of #data in the register r4 used as a data address pointer. The 12th to 14th lines are load instructions for loading data from the memory 200 into the registers r0 to r2. Therefore, the instruction conversion table 121 can be switched.

The instruction on the 15th line is a move instruction for setting an address of #ins_def in the register r4.

The instruction on the 16th line is a load instruction for loading setting contents of the instruction conversion table 121 from the memory 200 into t0. The instruction on the 17th line is an instruction for referring to the instruction conversion table 121 and replacing with an extension field.

The instruction on the 18th line is a load instruction for loading setting contents of the instruction conversion table 121 from the memory 200 into t0. The instruction on the 19th line is an instruction for referring to the instruction conversion table 121 and replacing with an extension field.

In this way, according to the fourth embodiment of the present technology, the contents of the instruction conversion table 121 can be dynamically switched. Therefore, as in the example described above, in a case of extending the 8-bit operation code to 12 bits by conversion, any 256 instructions out of a maximum of 4096 instructions are registered in the instruction conversion table 121, and all the 4096 instructions can be executed by rewriting this.

That is, according to the embodiment of the present technology, since an instruction word length can be reduced, a code size of a program can be reduced. Furthermore, for each application program, or for each section (for example, subroutine) of the application program, the code size can be optimized by changing the contents of the instruction conversion table 121 during execution of the program. Then, power consumption can be reduced by reduction of a circuit scale and instruction fetch from these.

Note that the embodiments described above are examples for embodying the present technology, and the matters in the embodiments and the matters used to specify the invention in the claims have a corresponding relationship. Similarly, the matters used to specify the invention in the claims and the matters in the embodiments of the present technology to which the same names are assigned have a corresponding relationship. However, the present technology is not limited to the embodiments, and can be embodied by applying various modifications to the embodiments without departing from the gist thereof.

Furthermore, the processing procedure described in the embodiment described above may be regarded as a method having a series of these procedures, and may be regarded as a program for causing a computer to execute the series of procedures, or a recording medium storing the program. As this recording medium, for example, a compact disc (CD), a MiniDisc (MD), a digital versatile disk (DVD), a memory card, a Blu-ray (registered trademark) disc, and the like can be used.

Note that the effects described in this specification are merely examples and are not limited, and additional effects may be present.

Note that the present technology can also have the following configurations.

(1) A processor including:

an instruction conversion table that stores an extension field longer than a predetermined field in association with a bit pattern of the predetermined field of an instruction;

an extension field acquisition unit configured to acquire the extension field by referring to the instruction conversion table with a bit pattern of the predetermined field of a fetched instruction; and an instruction decoder configured to perform a decoding process on a new instruction including the extension field in place of the predetermined field of the fetched instruction.

(2) The processor according to (1), in which the instruction conversion table associates at least a part of a bit pattern of an operation code with the bit pattern as the predetermined field, to store an operation code of the new instruction as the extension field.

(3) The processor according to (1) or (2), in which the instruction conversion table associates at least a part of a bit pattern of an operation code with the bit pattern as the predetermined field, to store an operation code of the new instruction and at least a part of an operand as the extension field.

(4) The processor according to any one of (1) to (3), in which the instruction conversion table includes mode information as the extension field, and the instruction decoder interprets an operand in the new instruction in accordance with the mode information.

(5) The processor according to any one of (1) to (4), in which the extension field acquisition unit acquires the extension field on condition that a bit pattern of the predetermined field of the fetched instruction is a specific pattern, and the instruction decoder performs a decoding process on the fetched instruction in a case where a bit pattern of the predetermined field of the fetched instruction is not the specific pattern.

(6) The processor according to any one of (1) to (5), further including a rewrite execution unit configured to rewrite a storage content of the instruction conversion table.

(7) The processor according to (6), in which in a case where an instruction decoded by the instruction decoder is a rewrite instruction of the instruction conversion table, the rewrite execution unit rewrites the instruction conversion table to a content specified by the instruction.

(8) A processor including:

an instruction conversion unit that stores an extension field longer than a predetermined field in association with a bit pattern of the predetermined field of an instruction, and converts into a new instruction including the extension field in place of the predetermined field of a fetched instruction; and an instruction decoder configured to perform a decoding process on the new instruction.

(9) An information processing apparatus including:
a memory that stores an instruction sequence;
an instruction conversion table that stores an extension field longer than a predetermined field in association with a bit pattern of the predetermined field of an instruction;
an extension field acquisition unit configured to acquire the extension field, by referring to the instruction conversion table with a bit pattern of the predetermined field of an instruction fetched from the memory; and
an instruction decoder configured to perform a decoding process on a new instruction including the extension field in place of the predetermined field of the fetched instruction,

(10) A processing method in a processor including an instruction conversion table that stores an extension field longer than a predetermined field in association with a bit pattern of the predetermined field of an instruction, the processing method including:
a procedure of extracting the predetermined field of a fetched instruction;
a procedure of acquiring the extension field by referring to the instruction conversion table with a bit pattern of the extracted predetermined field; and
a procedure of performing a decoding process on a new instruction including the extension field in place of the predetermined field of the fetched instruction.

REFERENCE SIGNS LIST

100 Processor
110 Fetch unit
120 Instruction conversion unit
121 Instruction conversion table
122 Extension field acquisition unit
130 Instruction decoder
140 Execution unit
200 Memory

The invention claimed is:

1. A processor, comprising:
a fetch unit configured to fetch an instruction from a memory, wherein the fetched instruction includes a first operation code and a first operand;
circuitry configured to store an instruction conversion table, wherein
the instruction conversion table includes an extension field in association with a bit pattern of the first operation code of the fetched instruction,
the extension field includes a second operation code and a second operand, and
the extension field has a longer bit pattern than the bit pattern of the first operation code;
an extension field acquisition unit configured to acquire the extension field from the instruction conversion table based on the bit pattern of the first operation code of the fetched instruction; and
an instruction decoder configured to execute a decoding process on a new instruction, wherein the new instruction includes the acquired extension field and the first operand of the fetched instruction.

2. The processor according to claim 1, wherein
the instruction conversion table further includes mode information in the extension field, and
the instruction decoder is further configured to determine the first operand in the new instruction based on the mode information.

3. The processor according to claim 1, wherein
the extension field acquisition unit is further configured to acquire the extension field based on a condition that the bit pattern of the first operation code of the fetched instruction is a specific pattern, and
the instruction decoder is further configured to execute the decoding process on the fetched instruction in a case the bit pattern of the first operation code is different from the specific pattern.

4. The processor according to claim 1, further comprising a rewrite execution unit configured to rewrite storage content of the instruction conversion table.

5. The processor according to claim 4, wherein
the decoded new instruction is a rewrite instruction of the instruction conversion table,
the rewrite execution unit is further configured to rewrite the instruction conversion table to content specified by the rewrite instruction.

6. A processor, comprising:
a fetch unit configured to fetch an instruction from a memory, wherein the fetched instruction includes a first operation code and a first operand;
an instruction conversion unit configured to:
store an extension field that has a longer bit pattern than a bit pattern of the first operation code of the fetched instruction, wherein
the extension field includes a second operation code and a second operand,
the extension field is stored in association with the bit pattern of the first operation code of the fetched instruction; and
convert the fetched instruction into a new instruction by substitution of the first operation code in the fetched instruction with the extension field; and
an instruction decoder configured to execute a decoding process on the new instruction that includes the extension field and the first operand of the fetched instruction.

7. An information processing apparatus, comprising:
a memory configured to store an instruction sequence;
a fetch unit configured to fetch an instruction from the memory, wherein the fetched instruction includes a first operation code and a first operand;
circuitry configured to store an instruction conversion table, wherein
the instruction conversion table includes an extension field in association with a bit pattern of the first operation code of the fetched instruction,
the extension field includes a second operation code and a second operand, and
the extension field has a longer bit pattern than the bit pattern of the first operation code;
an extension field acquisition unit configured to acquire the extension field from the instruction conversion table based on the bit pattern of the first operation code of the fetched instruction; and
an instruction decoder configured to execute a decoding process on a new instruction, wherein the new instruction includes the acquired extension field and the first operand of the fetched instruction.

8. A processing method comprising:
fetching an instruction from a memory, wherein the fetched instruction includes a first operation code and a first operand;

extracting the first operation code of the fetched instruction;
acquiring an extension field by from an instruction conversion table based on a bit pattern of the first operation code of the fetched instruction, wherein
 the instruction conversion table includes the extension field in association with the bit pattern of the first operation code of the fetched instruction,
 the extension field includes a second operation code and a second operand, and
 the extension field has a longer bit pattern than the bit pattern of the first operation code; and
executing a decoding process on a new instruction, wherein the new instruction includes the acquired extension field and the first operand of the fetched instruction.

\* \* \* \* \*